US006913396B2

(12) United States Patent
Nelson (10) Patent No.: US 6,913,396 B2
(45) Date of Patent: Jul. 5, 2005

(54) TUNABLE FIBER OPTIC CONNECTOR AND DEVICE AND METHOD FOR TUNING A CONNECTOR

(75) Inventor: Keith Quinten Nelson, Brooklyn Center, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 236 days.

(21) Appl. No.: 10/286,655

(22) Filed: Nov. 1, 2002

(65) Prior Publication Data

US 2004/0086236 A1 May 6, 2004

(51) Int. Cl.[7] .............................................. G02B 6/36
(52) U.S. Cl. ....................................................... 385/78
(58) Field of Search ............................. 385/78, 56–60, 385/70, 87, 72

(56) References Cited

U.S. PATENT DOCUMENTS

| | | |
|---|---|---|
| 4,690,494 A | 9/1987 | Hirose et al. |
| 4,744,621 A | 5/1988 | Tanabe et al. |
| 5,096,276 A | 3/1992 | Gerace et al. |
| 5,142,598 A | 8/1992 | Tabone |
| 5,146,525 A | 9/1992 | Tabone |
| 5,212,752 A | 5/1993 | Stephenson et al. |
| 5,222,169 A | 6/1993 | Chang et al. |
| 5,253,315 A | 10/1993 | Fentress |
| 5,265,183 A | 11/1993 | Feng et al. |
| 5,317,663 A | 5/1994 | Beard et al. |
| 5,348,487 A * | 9/1994 | Marazzi et al. .............. 439/138 |
| 5,390,269 A | 2/1995 | Palecek et al. |
| 5,436,995 A | 7/1995 | Yoshizawa et al. |
| 5,633,970 A | 5/1997 | Olson et al. |
| 5,682,451 A | 10/1997 | Lee et al. |
| 5,809,192 A | 9/1998 | Manning et al. |
| 5,946,436 A | 8/1999 | Takashi |
| 6,142,676 A | 11/2000 | Lu |
| RE37,079 E | 3/2001 | Stephenson et al. |
| RE37,080 E | 3/2001 | Stephenson et al. |
| 6,238,101 B1 * | 5/2001 | Chen et al. ................... 385/60 |
| 6,287,018 B1 | 9/2001 | Andrews et al. |
| 6,428,215 B1 | 8/2002 | Nault |
| 6,454,464 B1 * | 9/2002 | Nolan ........................ 385/60 |
| 6,464,402 B1 | 10/2002 | Andrews et al. |
| 6,464,408 B1 * | 10/2002 | Nolan ........................ 385/87 |
| 6,550,979 B1 * | 4/2003 | Fleenor et al. ............... 385/78 |
| 6,554,487 B2 * | 4/2003 | Nolan ........................ 385/78 |
| 6,558,048 B2 * | 5/2003 | Kuhara et al. ............... 385/93 |

FOREIGN PATENT DOCUMENTS

| | | | |
|---|---|---|---|
| EP | 1 072 914 A2 | 1/2001 | |
| EP | 1 072 915 A2 | 1/2001 | |
| JP | 2002365481 A * | 12/2002 | ............ G02B/6/38 |
| WO | WO 02/052310 A2 | 7/2002 | |

* cited by examiner

Primary Examiner—Thien M. Le
Assistant Examiner—Edwyn Labaze
(74) Attorney, Agent, or Firm—Merchant & Gould P.C.

(57) ABSTRACT

A fiber optic connector including a ferrule, a hub including a front portion, a housing surrounding the hub and including an inner surface including a bore, the inner surface including a first engagement surface, and a spring positioned within the housing to bias the hub. A press ring includes an outer surface and an inner surface, the outer surface including a second engagement surface configured to engage the first engagement surface of the inner surface of the housing to prevent relative rotation, and the inner surface of the press ring configured to engage the hub so that the hub is maintained in rotational alignment while moving along the longitudinal axis of the connector. A tuning tool is configured to engage and rotate the hub and allow the press ring to slide along an outer diameter of the tuning tool to be delivered to the bore of the connector.

35 Claims, 12 Drawing Sheets

TUNABLE FIBER OPTIC CONNECTOR AND DEVICE AND METHOD FOR TUNING A CONNECTOR

TECHNICAL FIELD

The present invention relates to fiber optic connectors for use in an optical fiber signal transmission system, and to devices and methods for tuning such fiber optic connectors.

BACKGROUND

Fiber optic cables are used in the telecommunication industry to transmit light signals in high-speed data and communication systems. A standard fiber optic cable includes a fiber with an inner light transmitting optical core. Surrounding the fiber is an outer protective casing.

A fiber terminates at a fiber optic connector. Connectors are frequently used to non-permanently connect and disconnect optical elements in a fiber optic transmission system. There are many different fiber optic connector types. Some of the more common connectors are FC and SC connectors. Other types of connectors include ST and D4-type connectors.

A typical SC fiber optic connector includes a housing having a front end positioned opposite from a rear end. The front end of the SC connector housing is commonly configured to be inserted within an adapter. An example adapter is shown in U.S. Pat. No. 5,317,663, assigned to ADC Telecommunications, Inc. The SC connector typically further includes a ferrule that is positioned within the front and rear ends of the housing, and adjacent the front end. The ferrule is axially moveable relative to the housing, and is spring-biased toward the front of the connector. The fiber optic cable has an end that is stripped. The stripped end includes a bare fiber that extends into the connector and through the ferrule.

A connector, such as the connector described above, is mated to another connector within an adapter like the adapter of U.S. Pat. No. 5,317,663. A first connector is received within the front portion of the adapter, and a second fiber is received within the rear portion of the adapter. When two connectors are fully received within an adapter, the ferrules (and hence the fibers internal to the ferrule) contact or are in close proximity to each other to provide for signal transmission between the fibers. Another connector and mating adapter is shown in U.S. Pat. No. 6,142,676, assigned to ADC Telecommunications, Inc.

Signal losses within a system often occur within the connection between two optical fiber cores. Due to manufacturing tolerances of the ferrule outer diameter to inner diameter concentricity, ferrule inner diameter hole size and fiber outer diameter, and fiber core to fiber outer diameter concentricity, when the fiber is inserted into the ferrule the core of a fiber may not and typically does not end up perfectly centered relative to the ferrule outer diameter. If one or both of the fibers are off center, when they are connected within an adapter, the fibers will not be aligned and thus there will be a signal loss when the signal is transmitted between the two fibers. It may therefore be desirable to tune a connector to minimize this signal loss. Tuning can be accomplished, for example, by measuring signal characteristics through the connector and/or by examining physical properties of the connector, and then determining the optimal position of the ferrule and fiber in the connector.

The orientation of the end face must be maintained with a high degree of precision so that the angled end face of the optic fiber and associated ferrule correctly engage an end face of an optic fiber and associated ferrule of another angled physical contact connector. Even a few degrees of misalignment can cause significant signal loss.

SUMMARY

The present invention relates to fiber optic connectors for use in an optical fiber signal transmission system, and to devices and methods for tuning such fiber optic connectors.

In one aspect, the invention relates to a fiber optic connector including an optical fiber, a ferrule surrounding the optical fiber, a hub retainably engaging the ferrule and including a front portion, a housing surrounding the hub and including an inner surface defining a bore, the inner surface including a first engagement surface, and a press ring including an outer surface and an inner surface, the outer surface defining a second engagement surface configured to engage the first engagement surface of the inner surface of the housing to prevent relative rotation, and the inner surface of the press ring configured to engage the hub so that the hub is maintained in rotational alignment while moving along the longitudinal axis of the connector.

In another aspect, the invention relates to a fiber optic connector including a ferrule surrounding the optical fiber, a hub retainably engaging the ferrule and including a front portion, a housing surrounding the hub and including an inner surface defining a bore, the inner surface including a first engagement surface, and a spring positioned within the housing to bias the hub into a forward position. Also included is a press ring including an outer surface and an inner surface, the outer surface defining a second engagement surface configured to engage the first engagement surface of the inner surface of the housing to prevent relative rotation, and the inner surface of the press ring configured to engage the hub so that the hub is maintained in rotational alignment while moving along the longitudinal axis of the connector.

In yet another aspect, the invention relates to a system for tuning a fiber optic connector, the connector including a hub engaging a ferrule surrounding an optical fiber of the fiber optic connector, a housing surrounding the hub and including an inner surface defining a bore, the inner surface including a first engagement surface. The system includes a tuning tool configured to engage and rotate the hub, and a press ring including an outer surface and an inner surface, the outer surface defining a second engagement surface configured to engage the first engagement surface to prevent relative rotation, and the inner surface of the press ring configured to engage the hub so that the hub is maintained in rotational alignment while moving along the longitudinal axis of the connector.

In another aspect, the invention relates to a method for tuning a fiber optic connector including steps of: providing a ferrule surrounding an optical fiber with a hub retainably engaging the ferrule; providing a housing surrounding the hub and including an inner surface defining a bore, the inner surface defining a first engagement surface; providing a tuning tool, the tuning tool configured to engage and rotate the hub about the longitudinal axis; engaging the tuning tool with the hub of the fiber optic connector; tuning the fiber optic connector using the tuning tool by rotating the hub and associated ferrule and optical fiber about the longitudinal axis of fiber optic connector; sliding a press ring along the tuning tool toward the hub, the press ring including an outer surface and an inner surface, the outer surface defining a second engagement surface configured to engage the first engagement surface of the inner surface of the housing to prevent relative rotation, and the inner surface of the press ring configured to engage the hub so that the hub is maintained in rotational alignment while moving along the longitudinal axis of the connector; and pressing the press ring into the housing, thereby retaining the optical fiber at a known rotational orientation with respect to the housing.

In yet another aspect, the invention relates to a method for fixing a hub of a fiber optic connector in rotational alignment with respect to a housing of the connector, the method including: providing a tuning tool, the tuning tool configured to engage and rotate the hub about a longitudinal axis of the connector; tuning the fiber optic connector using the tuning tool by rotating the hub and associated ferrule and optical fiber about the longitudinal axis of fiber optic connector; sliding a press ring along the tuning tool toward the hub, the press ring including an outer surface and an inner surface, the outer surface defining a geometry complementary to an inner surface of the housing to prevent relative rotation, and the inner surface of the press ring configured to engage the hub so that the hub is maintained in rotational alignment while moving along the longitudinal axis of the connector; and pressing the press ring into the housing, thereby retaining the optical fiber at a known rotational orientation with respect to the housing.

In another aspect, the invention relates to a method for fixing a hub of a fiber optic connector in rotational alignment with respect to a housing of the connector, the method including: tuning the fiber optic connector by rotating the hub and associated ferrule and optical fiber about the longitudinal axis of fiber optic connector; sliding a press ring toward the hub, the press ring including an outer surface and an inner surface, the outer surface defining a geometry complementary to an inner surface of the housing to prevent relative rotation, and the inner surface of the press ring configured to engage the hub so that the hub is maintained in rotational alignment while moving along the longitudinal axis of the connector; and pressing the press ring into the housing, thereby retaining the optical fiber at a known rotational orientation with respect to the housing.

In yet another aspect, the invention relates to a kit for tuning a fiber optic connector, the connector including a hub engaging a ferrule surrounding an optical fiber of the fiber optic connector, a housing surrounding the hub and including an inner surface defining a bore, the inner surface defining a first engagement surface. The kit includes a tuning tool configured to engage and rotate the hub; and a press ring including an outer surface and an inner surface, the outer surface defining a second engagement surface configured to engage the first engagement surface of the inner surface of the housing to prevent relative rotation, and the inner surface of the press ring configured to engage the hub so that the hub is maintained in rotational alignment while moving along the longitudinal axis of the connector.

DETAILED DESCRIPTION OF THE PREFERRED EMBODIMENT

Reference will now be made in detail to exemplary aspects of the present invention that are illustrated in the accompanying drawings. Wherever possible, the same reference numbers will be used throughout the drawings to refer to the same or like parts.

Figure 1:
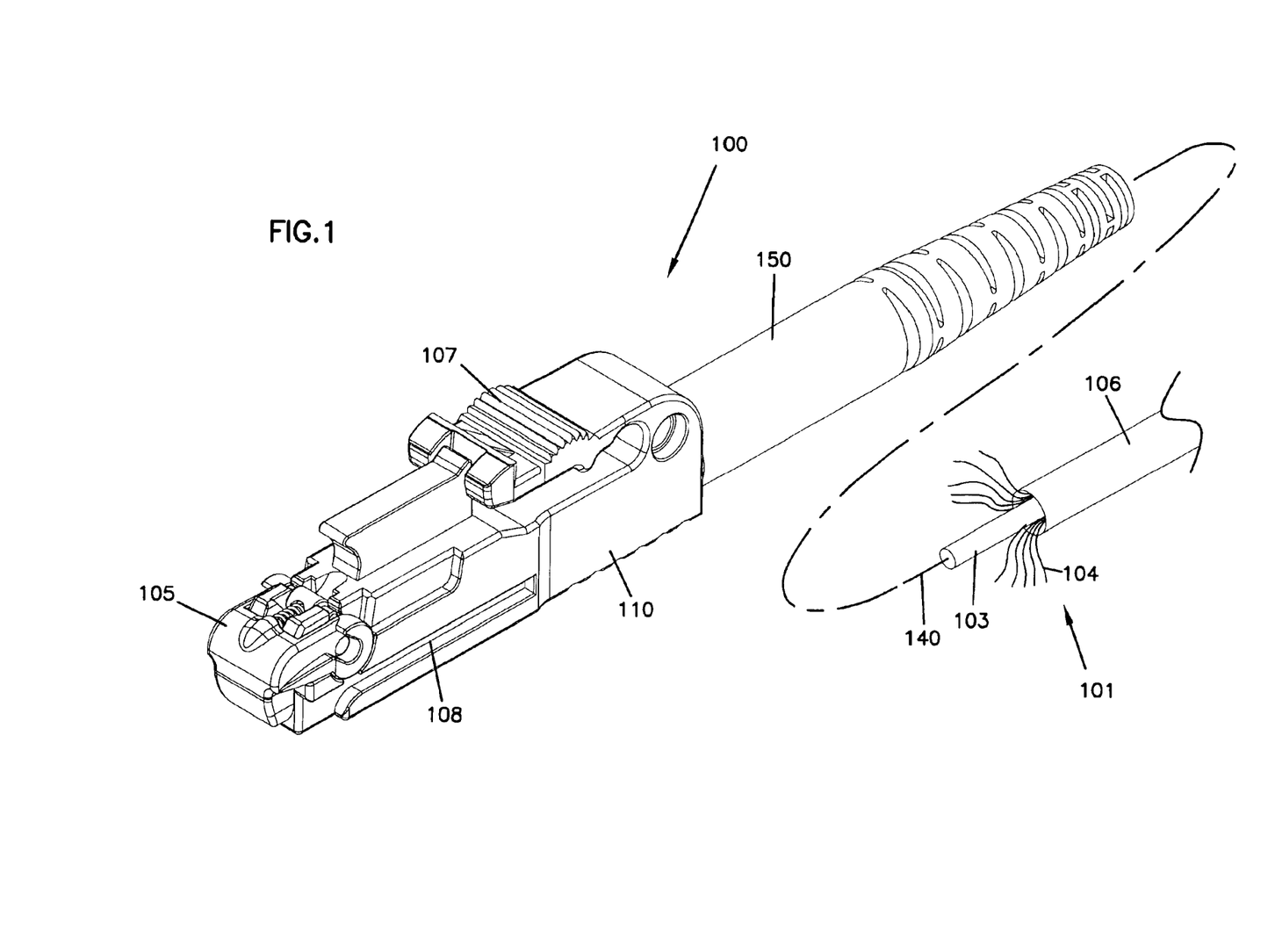
FIG. 1 is a perspective view of an example embodiment of a fiber optic connector made in accordance with the present invention.
Figure 2:
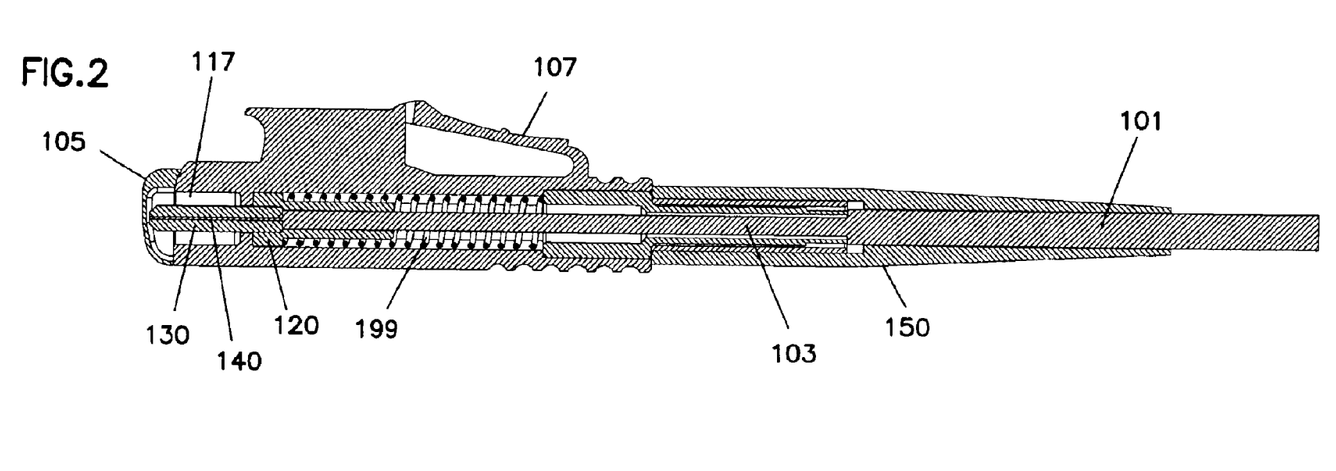
FIG. 2 is a side cross-sectional view of the connector shown in FIG. 1.

FIGS. 1 and 2 illustrate an example embodiment of a connector 100 made in accordance with the present invention. The connector 100 generally includes a housing 110 and a boot 150 coupled to one another by an interference fit. A fiber optic cable 101 is shown including a fiber 140 and an inner jacket 103. A reinforcing layer 104 and an outer jacket 106 surround the fiber 140 and the inner jacket 103.

The example connector 100 shown in FIGS. 1 and 2 includes a spring-biased pivoting front cover 105 which biases the cover 105 toward a closed position (as shown in FIGS. 1 and 2). When the connector 100 is mated with an adapter, the cover 105 is forced into an open position (not shown). A latch 107 latches connector 100 to the adapter. Guides 108 on either side of the housing 110 engage rails on the adapter to guide the connector 100 into the adapter.

The inner jacket 103 of the fiber optic cable 101 extends along the connector 100 and is terminated by a ferrule 130. The fiber 140 extends through and is glued to the ferrule 130. The inner jacket 103 and the ferrule 130 are partially surrounded by a hub 120 The fiber optic cable 101, ferrule 130, and associated hub 120 are inserted into a back end of the housing 110 and are extended through a bore 17 defined by the housing 110. A spring 199 biases the hub 120 in a forward position.

Further details of the exterior features of the connector 100 and mating adapter are shown and described in U.S. Pat. No. 6,142,676, the disclosure of which is hereby incorporated by reference. Although the example connector 100 is shown in FIG. 1, other connectors of different styles may be used. For example, an SC connector may also be used.

The hub 120 and ferrule 130 of connector 100 of the present invention are rotatable for tuning. The hub 120 and ferrule 130 can be locked into place in the desired tuned position. Once tuned, insertion loss (i.e., signal loss) is minimized.

Figure 3:
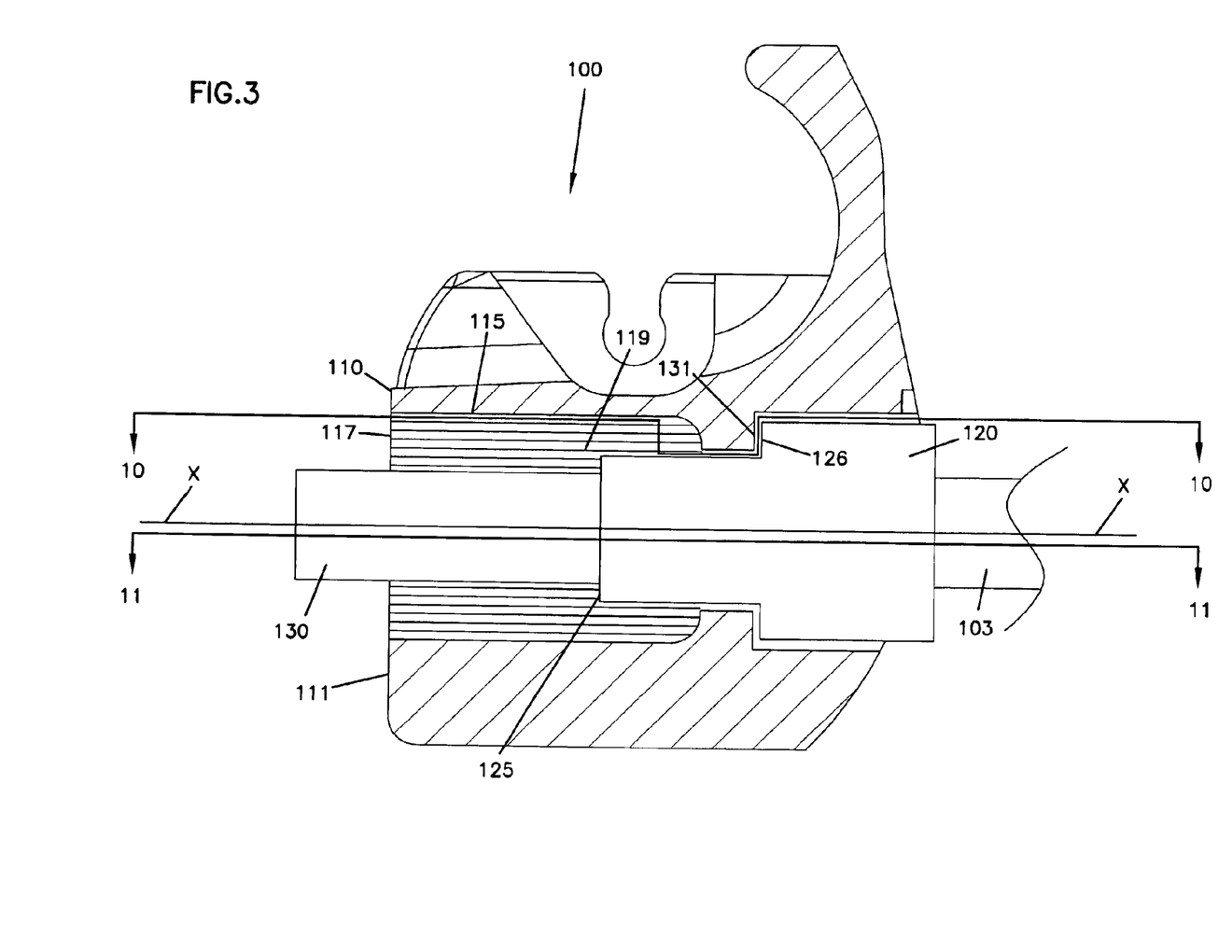
FIG. 3 is a side cross-sectional view through a portion of a housing of a fiber optic connector with the front cover removed.
Figure 4:
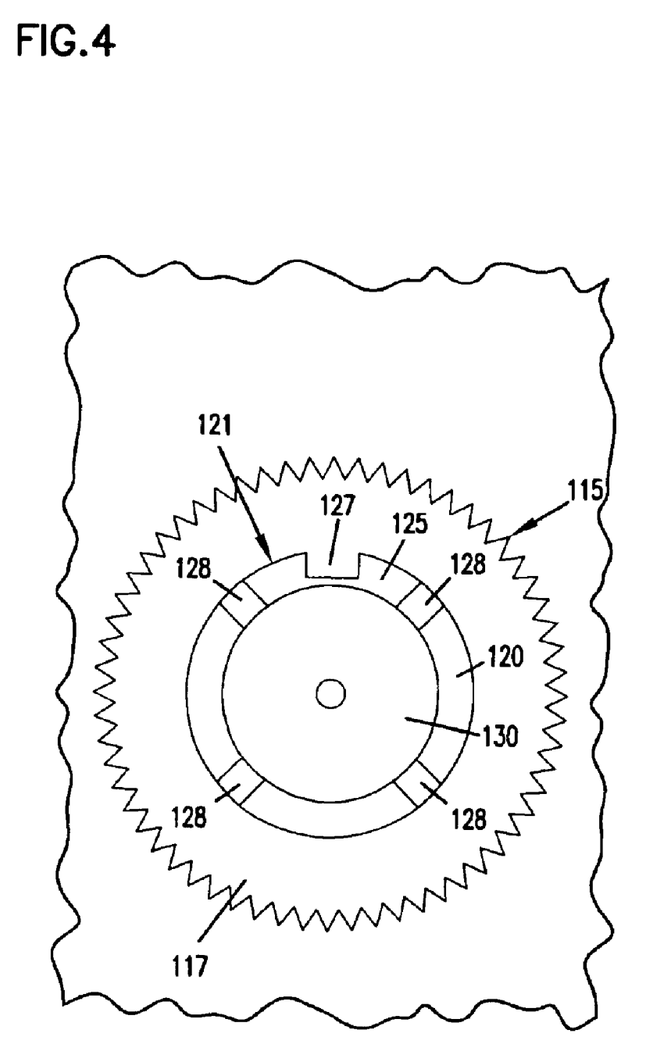
FIG. 4 is an end view of a portion of the connector of FIG. 3.

Referring now to FIGS. 3 and 4, a side cross-sectional view and an end view of the example connector 100 are shown. The bore 117 defined by the housing 110 includes an inner surface 115. The inner surface 115 may include, for example, a plurality of grooves 119. Other configurations for the inner surface, such as slots, ridges, and serrations, may also be used. The bore 117 may be slightly tapered inwardly as the bore 117 extends along a longitudinal axis X of the connector 100 from a front 111 of the connector 100 towards a back of the connector.

The hub 120 includes a front portion 125 and a shoulder 126. The spring 199 biases the shoulder 126 of the hub 120 against a shoulder 131 of the housing 110. The hub 120 and associated ferrule 130 may be freely rotated about the longitudinal axis X of the connector 100. The hub 120 may be rotated, for example, to tune the connector 100. This rotation may be accomplished using a tuning tool, as shown in and described with reference to FIGS. 8–11 below. When the hub 120 and associated ferrule 130 are at a desired rotational orientation with respect to the housing 110, the hub 120 may be maintained at the orientation using a press ring, as described below.

In FIG. 4, the hub 120 includes an outer surface 121 and a notch 127. The hub 120 further includes four detents 128 defined on the front portion 125. More or fewer than four detents may also be used, such as, for example, two detents. The detents 128 may be used to engage a tuning tool, as described below.

Figure 5:
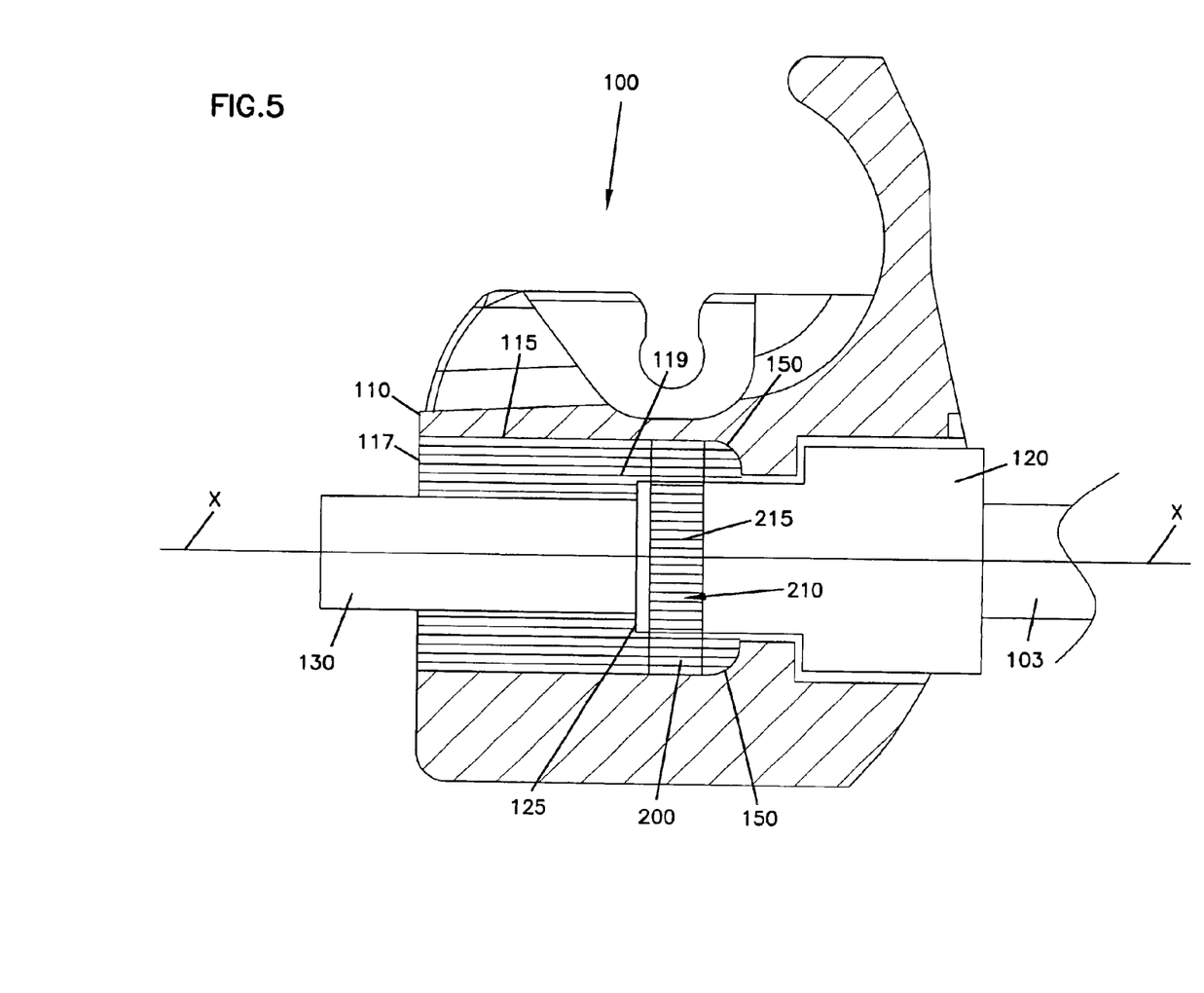
FIG. 5 is the side cross-sectional view of the connector shown in FIG. 3 including an example embodiment of a press ring made in accordance with the present invention.
Figure 6:
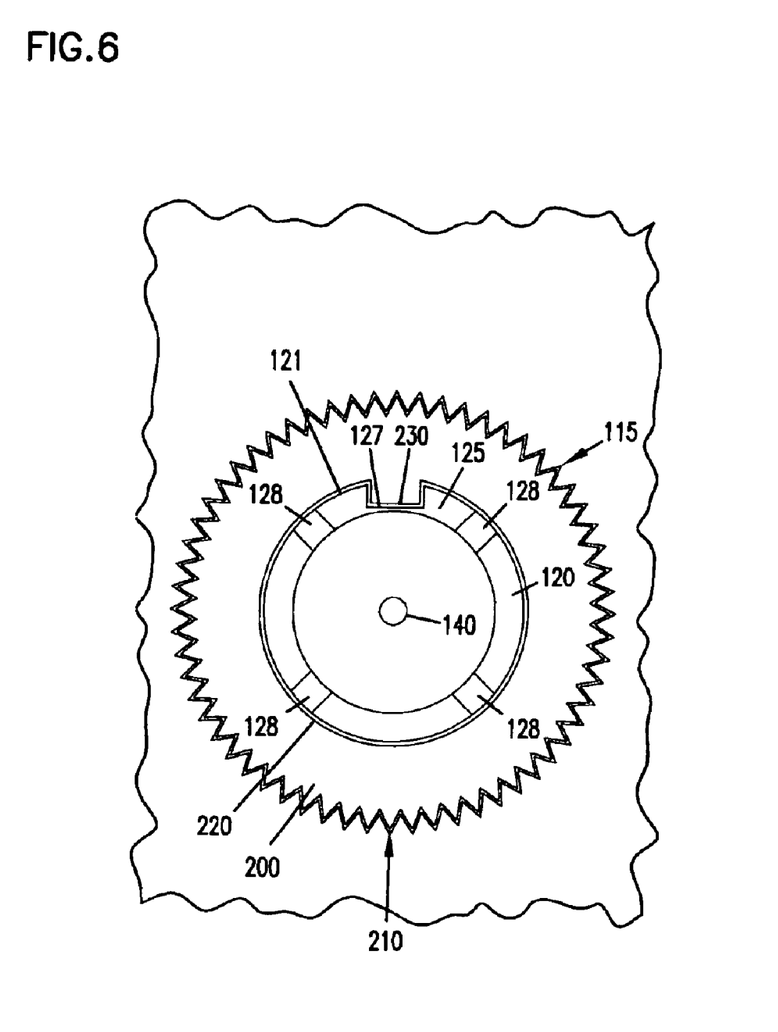
FIG. 6 is an end view of a portion of the connector of FIG. 5.
Figure 7:
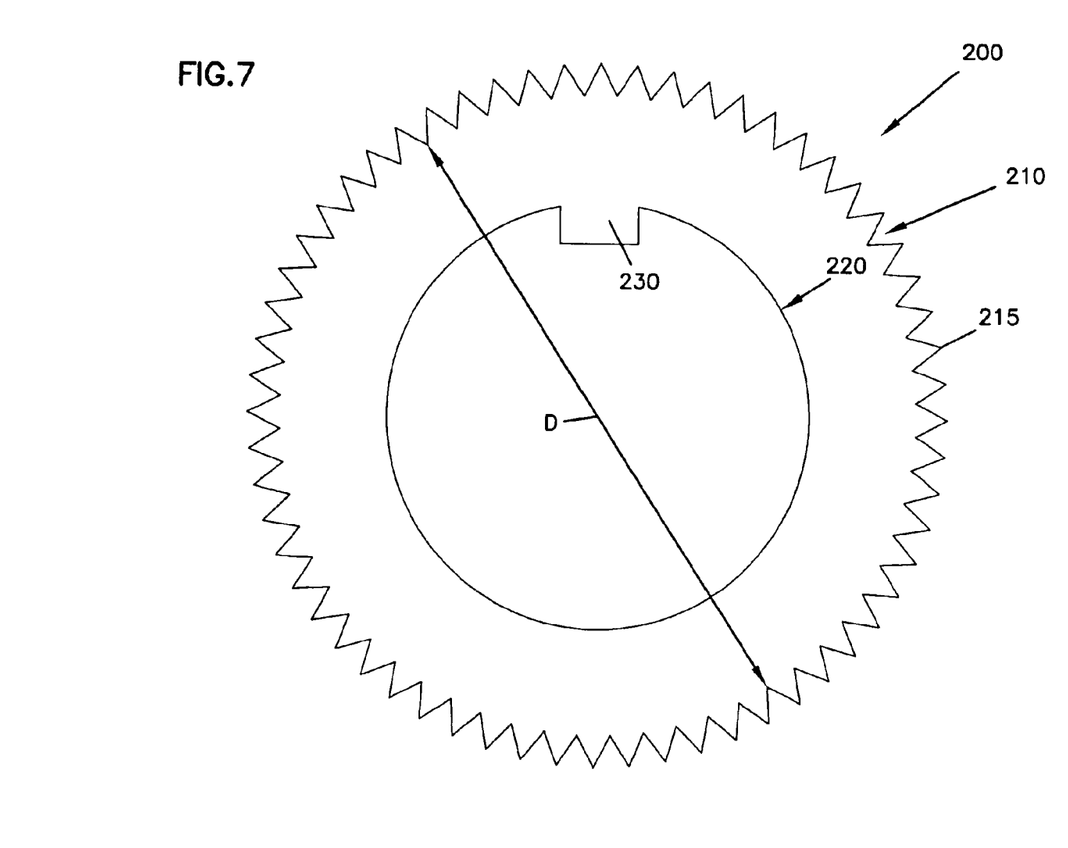
FIG. 7 is an end view of an example embodiment of a press ring made in accordance with the present invention.

Referring now to FIGS. 5–7, an example embodiment of a press ring 200 is shown disposed within the connector 100 (FIGS. 5 and 6) and in isolation (FIG. 7). The press ring 200 includes an outer surface 210. In the example embodiment, the outer surface 210 includes a plurality of ridges 215. Each ridge of the plurality of ridges 215 is spaced to engage one or more of the plurality of grooves 119 defined on the inner surface 115 of the bore 117. Other complementary engagement surfaces can also be used, such as, for example, slots, projections, serrations, etc.

As illustrated in the end view of the connector 100 shown in FIG. 6, an inner surface 220 of the press ring 200 generally surrounds the outer surface 121 of the hub 120, but is sized to allow the hub 120 to slide in the longitudinal direction X through the press ring 200. The notch 127 of the hub 120 is configured to engage a tab 230 on the press ring 200. The notch 127 captures the tab 230 and maintains the hub 120 in a given rotational orientation as the hub 120 moves in the longitudinal direction X.

The plurality of ridges 215 of the outer surface 210 of the press ring 200 engage the plurality of grooves 119 defined in the inner surface 115 of the housing 110. An outer diameter D of the press ring 200 (see FIG. 7) is sized to allow the press ring 200 to slide along the bore 117 of the housing 110. As the press ring 200 approaches seats 150 in the bore 117, the press ring 200 engages the inner surface 115 of the bore 117 and becomes lodged due to the tapering of the bore 117. In this configuration, the press ring 200 is held by a frictional or interference fit in the housing 110 so that the press ring 200 remains fixed in rotational orientation with respect to the housing 110 and will not come out of the housing 110.

Figure 8:
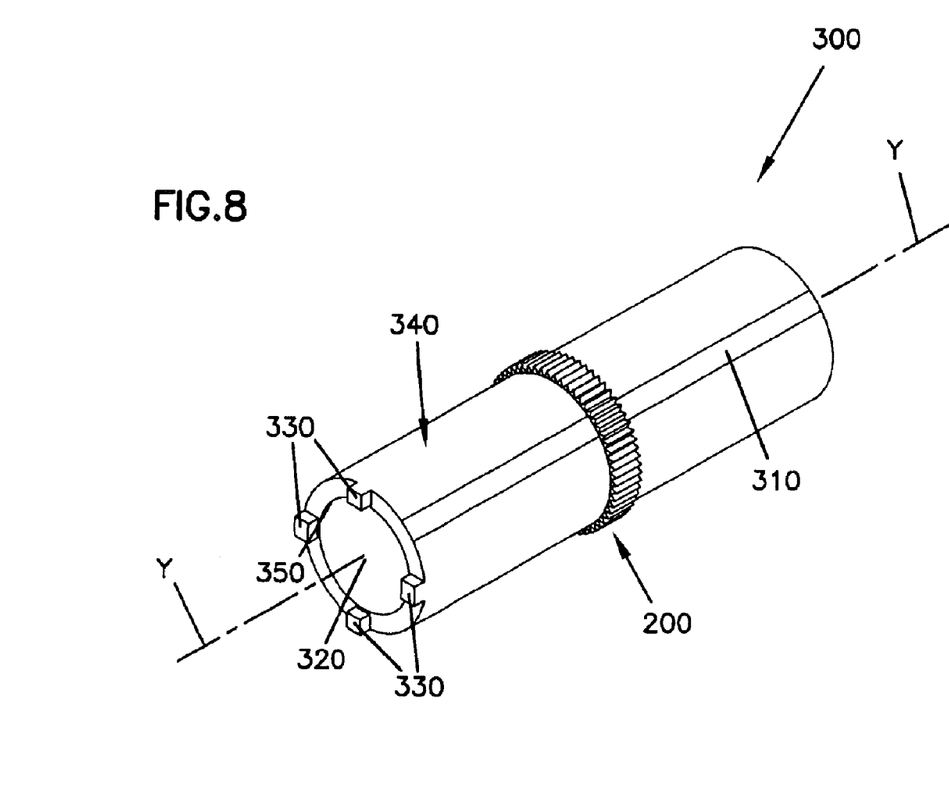
FIG. 8 is a perspective view of an example embodiment of a tuning tool including a press ring made in accordance with the present invention.
Figure 9:
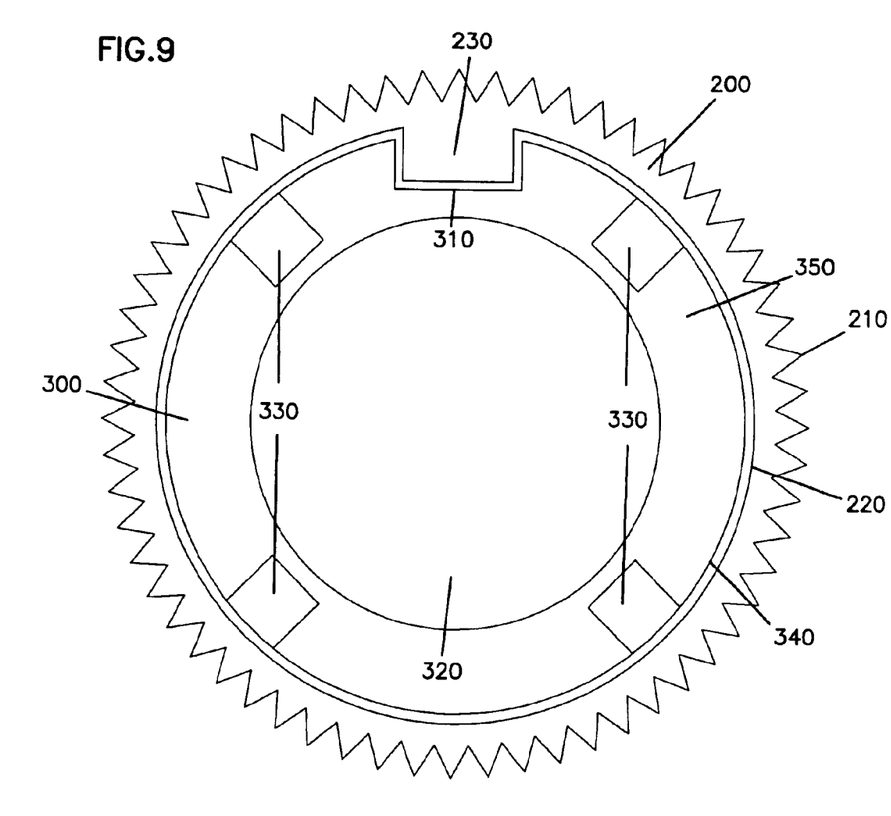
FIG. 9 is an end view of the tuning tool shown in FIG. 8.

Referring now to FIGS. 8 and 9, an example embodiment of a tuning tool 300 is shown. The tuning tool 300 includes an outer surface 340 defining a groove 310. The groove 310 is sized to engage the tab 230 of the press ring 200 and thereby allows the press ring 200 to move along a longitudinal axis Y of the tuning tool 300. An end surface 350 of the tuning tool 300 includes four knobs 330 spaced to engage each of the detents 128 on the hub 120 of the connector 100. More or fewer knobs, such as, for example, two knobs, may also be used to engage the detents 128. The tuning tool 300 further defines a bore 320 sized to surround and accept at least a portion of the ferrule 130 of the connector 100.

Figure 10:
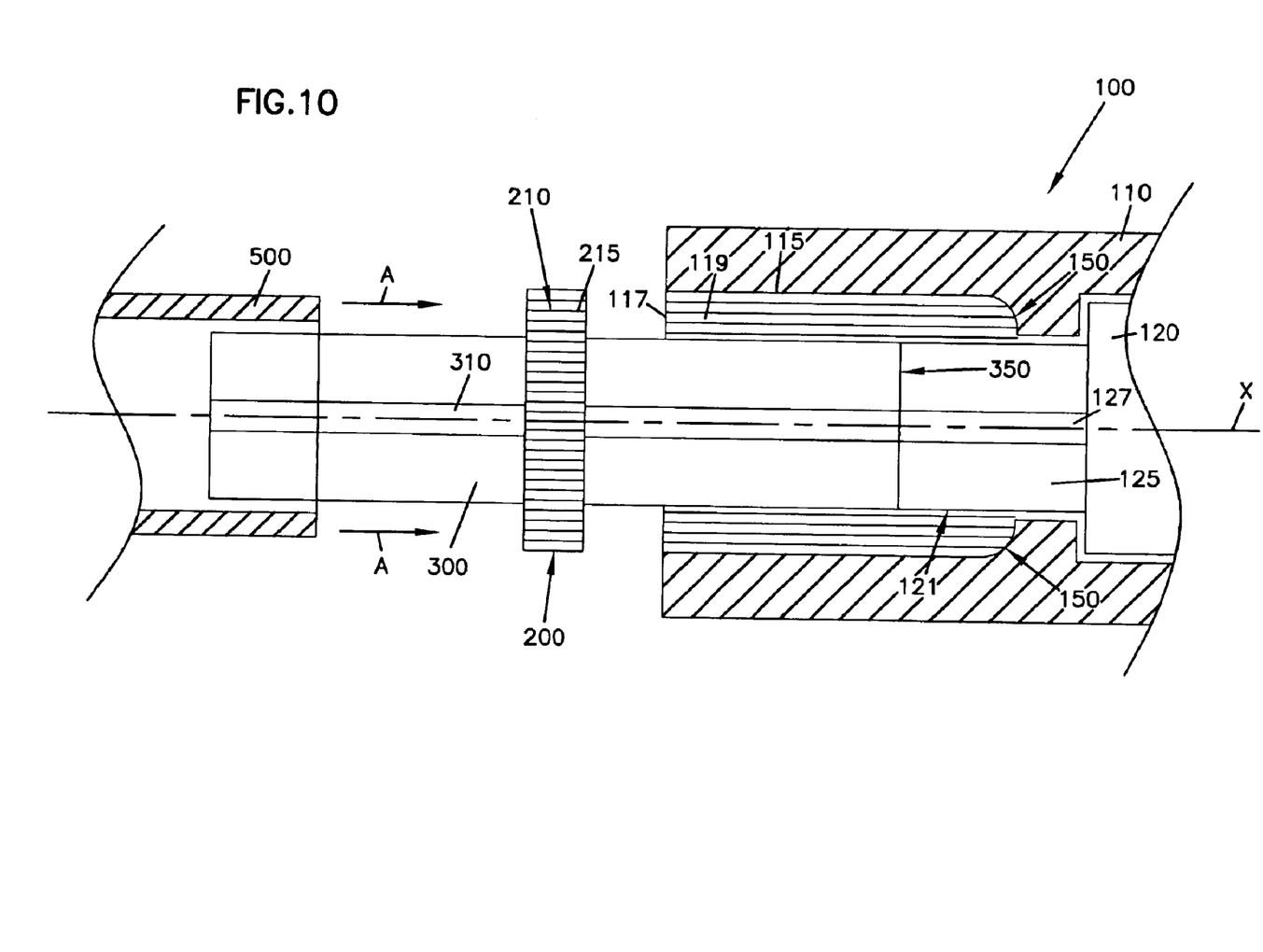
FIG. 10 is a top cross-sectional view taken along line 10—10 of FIG. 3 showing the connector as well as an example tuning tool engaging a hub of the connector and a press ring positioned to be moved longitudinally along the tuning tool using an example sleeve.

Referring now to FIG. 10 illustrating a cross-sectional view taken through the housing from a top of the connector 100, an example method for using the tuning tool 300 is described. The tuning tool 300 is inserted into the bore 117 of the connector 100. The tuning tool 300 is moved along the longitudinal axis X, and a portion of the ferrule 130 is received within the bore 320 of the tuning tool 300. The tuning tool 300 is advanced until the end surface 350 engages the front portion 125 of the hub 120. The knobs 330 of the tuning tool 300 engage each of the detents 128 of the hub 120. The tuning tool is aligned so that the groove 310 is oriented with the notch 127 of the hub 120. In this configuration, the hub 120 and associated fiber 140 may be freely rotated, as desired, about the longitudinal axis X to a desired orientation.

Once the desired rotational orientation of the hub 120 is achieved, the press ring 200 is slid along the tuning tool 300 in a direction A into the bore 117 of the housing 110. The press ring 200 may be slid along the tuning tool 300 using, for example, a sleeve 500 sized to slide over the tuning tool 300 and fit within the bore 117. The sleeve 500 may be pushed in the direction A to move the press ring 200 into the connector 100. Other configurations besides the sleeve 500 may also be used to slide the press ring 200 into place.

As the press ring 200 enters the bore 117, the plurality of ridges 215 on the outer surface 210 of the press ring 200 engage the plurality of grooves 119 defined on the inner surface 115 of the bore 117. The press ring 200 is slid in the direction A until it passes over the end surface 350 of the tuning tool 300 and onto the outer surface 121 of the front portion 125 of the hub 120. At the same time, the tab 230 exits the groove 310 of tuning tool 300 and enters the notch 127 of the hub 120. The press ring 200 is moved along the hub 120 until the press ring approaches the seats 150 and becomes lodged in the bore 117 due to its tapering. Because of the relative size of the press ring 200 in relation to the bore 117, the press ring 200 is maintained within the bore 117 by a frictional or interference fit, and the press ring 200 is maintained in rotational alignment through the engagement of the plurality of ridges 215 of the press ring 200 with the plurality of grooves 119 of the housing 110.

Once the press ring 200 is in place within the connector housing 110, the tuning tool 300, along with the sleeve 500, are removed. In this configuration, the hub 120 and associated fiber 140 may move along the longitudinal axis X, but may not rotate about the longitudinal axis X because of the engagement of the tab 230 of the press ring 200 within the notch 127 of the hub 120. In this manner, the hub 120 and associated fiber 140 are maintained in rotational alignment.

Figure 11:
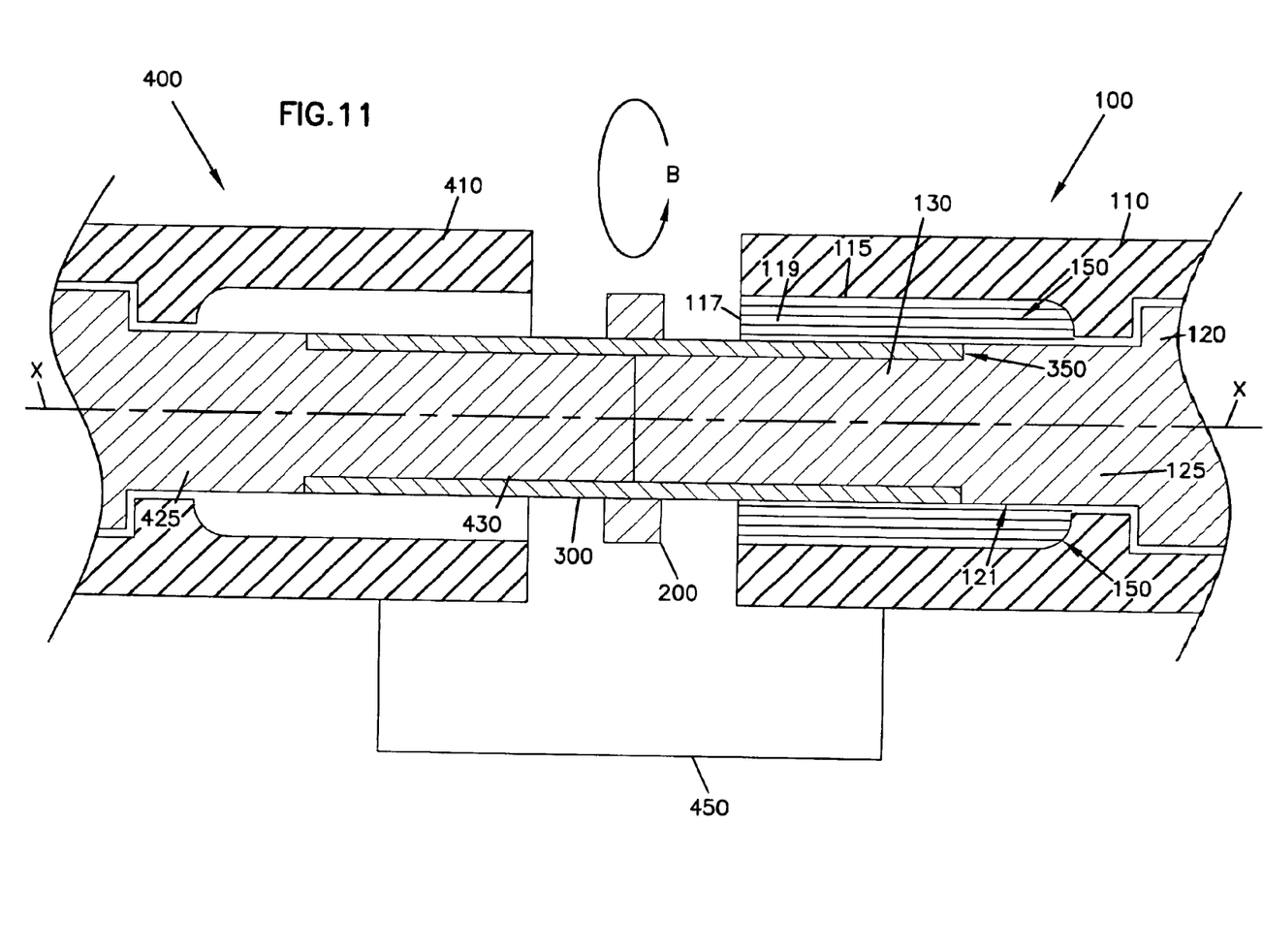
FIG. 11 is a top cross-sectional view taken along line 11—11 of FIG. 3 showing the connector as well as an example embodiment of a master connector for tuning the connector.
Figure 12:
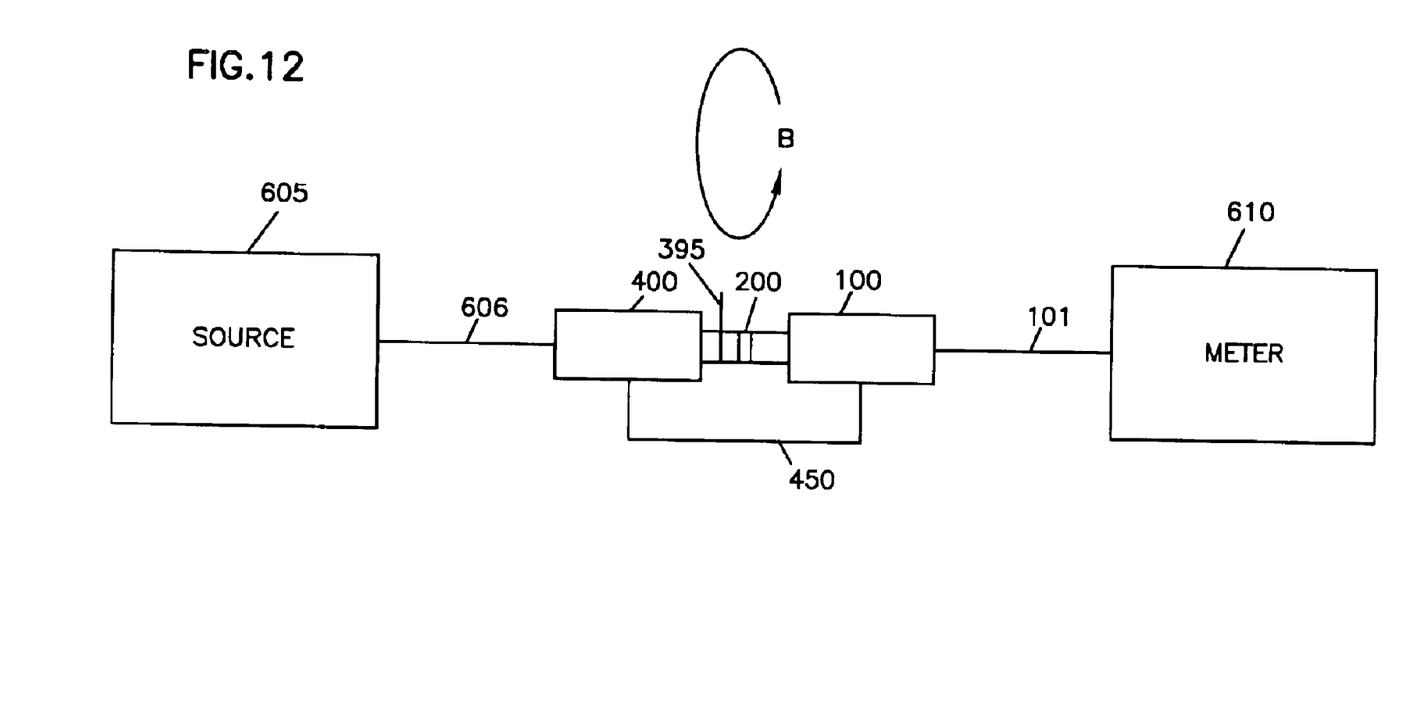
FIG. 12 is a schematic view of the connector and master connector of FIG. 11, as well as a light source and a power meter.

Referring now to FIGS. 11 and 12, an example system and method for tuning the connector 100 are provided. The system and method may be automated or manual. In the example manual method of tuning illustrated in FIG. 11, a master cable 606 including a master connector 400 is used. A master connector is a connector having a known eccentric orientation.

As shown, the connector 100 is coupled to the master connector 400 by the tuning tool 300. More specifically, the housing 110 of the connector 100 is held in a specific orientation with respect to a housing 410 of the master connector 400. In the example shown, a structure 450 is used to hold the two connectors 100 and 400 in the given orientation, although any similar structure may be also be used to hold the connectors.

The tuning tool 300 is positioned against the front portion 125 of the holder 120, allowing the ferrule 130 to extend partially through the tuning tool 300. An opposite end of the tuning tool 300 accepts a ferrule 430 of the master connector 400 so that a front portion 425 of a hub 420 of the master connector 400 abuts the tuning tool 300. In this configuration, the ferrule 130 of the connector 100 is positioned to contact the ferrule 430 of the master connector 400 within the tuning tool 300.

An opposite end of the master cable may be coupled to a source of light 605, such as, in this example embodiment, polarized light, so that polarized light is directed through the master connector 400. An opposite end of the cable 101 may be coupled to a measuring device, such as a power meter 610. Polarized light may then be passed through the master cable, through the master connector 400, and enter the ferrule 130 of the connector 100. The light is then passed through the cable 101 to the power meter. The intensity of the light reaching the power meter may be measured, thereby allowing such measurements as insertion loss to be recorded.

The tuning tool 300 is then rotated using, in the manual embodiment, a wrench 395 configured to grasp and turn the tuning tool 300. As the tuning tool 300 is rotated in a direction B, the hub 120 and associated ferrule 130 of the connector 100 are rotated because of the engagement of the knobs 330 on the tuning tool 300 with the detents 128 on the hub 120. The ferrule 430 of the master connector 400 remains stationary during rotation of the tuning tool 300 and ferrule 130.

As the tuning tool 300 and ferrule 130 are rotated, insertion loss measurements are taken. The tuning tool 300 may be rotated an entire 360 degrees and the minimum or maximum insertion loss noted. The tuning tool 300 and associated ferrule 130 may then be returned to the position at which insertion loss was minimized or maximized, as desired, thereby identifying the "tuned" position for the connector 100.

Next, keeping the tuning tool 300 in the given eccentric orientation, the press ring 200 is slid over the tuning tool 300 and placed in position. In the example embodiment shown, this is accomplished by removing the master connector 400 and sliding the press ring 200 into the connector using the sleeve 500, as illustrated in FIG. 10. In another embodiment, a second tool (not shown) may be used to slide the press ring 200 into place within the connector 100 without removing the master connecter 400 from the tuning tool 300. Once in place, the press ring 200 holds the ferrule 130 in the desired eccentric orientation with respect to the housing 110.

The automated system and method for tuning the connector 100 are similar to the manual method described above, except that rotation of the tuning tool 300 and placement of the push ring 200 may be automated. For example, an automated system may include a drive system configured to rotate the tuning tool, record insertion loss, and automatically identify and place the ferrule of the connector in the desired eccentric orientation. The automated system may also include an automated sleeve to push the push ring into position within the connector.

Once in place, the press ring may, in an alternative embodiment, optionally be held in place within the connector housing using epoxy or another form of glue. In another alternative embodiment, the press ring may be snapped into place using, for example, an undercut.

In the example embodiments described herein, a high degree of tuning is possible. If greater precision is needed, a greater number of ridges and complementary grooves may be used to provide finer tuning capability. In addition, if even a higher degree of tuning is desired, other engagement surfaces such as serrations or the like may be used to allow for infinite tuning of a connector. In the case of polarization maintaining fibers, a high degree of tuning is advantageous for producing acceptable connectors. The tuning tool may be used with a variety of connector types such as, for example and without limitation, FC, SC, ST, D4, and LX.5-type connectors.

The above specification, examples and data provide a complete description of the manufacture and of the invention. Since many embodiments of the invention can be made without departing from the spirit and scope of the invention, the invention resides in the claims hereinafter appended.

What is claimed is:

1. A fiber optic connector comprising:
   an optical fiber;
   a ferrule surrounding the optical fiber;
   a hub retainably engaging the ferrule and including a front portion;
   a housing surrounding the hub and including an inner surface defining a bore, the inner surface including a first engagement surface; and
   a press ring including an outer surface and an inner surface, the outer surface defining a second engagement surface configured to engage the first engagement surface of the inner surface of the housing to prevent relative rotation, and the inner surface of the press ring configured to engage the hub so that the hub is maintained in rotational alignment while moving along the longitudinal axis of the connector.

2. The connector of claim 1, wherein the front portion of the hub defines a notch and the inner surface of the press ring includes a tab, the notch being configured to capture the tab to hold the hub in rotational alignment.

3. The connector of claim 1, wherein the first engagement surface includes a plurality of grooves defined by the inner surface of the housing, and the second engagement surface is a plurality of ridges defined by the outer surface of the press ring, each ridge of the plurality of ridges corresponding to a groove of the plurality of grooves on the inner surface of the housing.

4. The connector of claim 3, wherein the front portion of the hub defines a notch and the inner surface of the press ring includes a tab, the notch being configured to capture the tab to hold the hub in rotational alignment.

5. The connector of claim 4, wherein an end face of the front portion of the hub includes means for engaging a tuning tool.

6. The connector of claim 1, wherein an end face of the front portion of the hub includes means for engaging a tuning tool.

7. The connector of claim 1, wherein an end face of the front portion of the hub includes at least one detent for engaging a tuning tool.

8. The connector of claim 1, wherein the press ring is retained within the bore of the connector by a frictional fit.

9. A fiber optic connector comprising:
   a ferrule surrounding the optical fiber;
   a hub retainably engaging the ferrule and including a front portion;
   a housing surrounding the hub and including an inner surface defining a bore, the inner surface including a first engagement surface;

a spring positioned within the housing to bias the hub into a forward position; and a press ring including an outer surface and an inner surface, the outer surface defining a second engagement surface configured to engage the first engagement surface of the inner surface of the housing to prevent relative rotation, and the inner surface of the press ring configured to engage the hub so that the hub is maintained in rotational alignment while moving along the longitudinal axis of the connector.

10. The connector of claim 9, wherein the front portion of the hub defines a notch and the inner surface of the press ring includes a tab, the notch being configured to capture the tab to hold the hub in rotational alignment.

11. The connector of claim 9, wherein the first engagement surface includes a plurality of grooves defined by the inner surface of the housing, and the second engagement surface is a plurality of ridges defined by the outer surface of the press ring, each ridge of the plurality of ridges corresponding to a groove of the plurality of grooves on the inner surface of the housing.

12. The connector of claim 11, wherein the front portion of the hub defines a notch and the inner surface of the press ring includes a tab, the notch being configured to capture the tab to hold the hub in rotational alignment.

13. The connector of claim 12, wherein an end face of the front portion of the hub includes means for engaging a tuning tool.

14. The connector of claim 9, wherein an end face of the front portion of the hub includes means for engaging a tuning tool.

15. The connector of claim 9, wherein an end face of the front portion of the hub includes at least one detent for engaging a tuning tool.

16. The connector of claim 9, wherein the press ring is retained within the bore of the connector by a frictional fit.

17. A system for tuning a fiber optic connector, the connector including a hub engaging a ferrule surrounding an optical fiber of the fiber optic connector, a housing surrounding the hub and including an inner surface defining a bore, the inner surface including a first engagement surface, the system comprising:

a tuning tool configured to engage and rotate the hub; and a press ring including an outer surface and an inner surface, the outer surface defining a second engagement surface configured to engage the first engagement surface to prevent relative rotation, and the inner surface of the press ring configured to engage the hub so that the hub is maintained in rotational alignment while moving along the longitudinal axis of the connector.

18. The system of claim 17, wherein a diameter of the inner surface of the press ring is greater than a diameter of the tuning tool so that the press ring fits over and slides along the tuning tool.

19. The system of claim 18, wherein the tuning tool defines a groove running longitudinally along the tuning tool, and wherein the press ring includes a tab on the inner surface to engage the groove of the tuning tool as the press ring is slid along the tuning tool.

20. The system of claim 19, wherein the tab of the press ring engages a notch of the hub when the press ring is seated in the bore of the housing.

21. The system of claim 17, wherein the tuning tool includes knobs to engage detents defined by an end face of the hub to rotate the hub to a desired rotational tuning position.

22. The system of claim 17, wherein the press ring is retained within the bore of the connector by a frictional fit.

23. The system of claim 17, further comprising a sleeve configured to slide the press ring along the tuning tool and into the bore of the connector.

24. A method for tuning a fiber optic connector comprising steps of:

providing a ferrule surrounding an optical fiber with a hub retainably engaging the ferrule;

providing a housing surrounding the hub and including an inner surface defining a bore, the inner surface defining a first engagement surface;

providing a tuning tool, the tuning tool configured to engage and rotate the hub about the longitudinal axis;

engaging the tuning tool with the hub of the fiber optic connector;

tuning the fiber optic connector using the tuning tool by rotating the hub and associated ferrule and optical fiber about the longitudinal axis of fiber optic connector;

sliding a press ring along the tuning tool toward the hub, the press ring including an outer surface and an inner surface, the outer surface defining a second engagement surface configured to engage the first engagement surface of the inner surface of the housing to prevent relative rotation, and the inner surface of the press ring configured to engage the hub so that the hub is maintained in rotational alignment while moving along the longitudinal axis of the connector; and pressing the press ring into the housing, thereby retaining the optical fiber at a known rotational orientation with respect to the housing.

25. The method of claim 24, further comprising a step of aligning a tab on the inner surface of the press ring with a groove running along a longitudinal direction of the tuning tool.

26. The method of claim 24, further comprising a step of aligning a tab on the inner surface of the press ring with a notch on the hub.

27. The method of claim 24, further comprising a step of disengaging the tuning tool from the hub of the fiber optic connector.

28. The method of claim 24, wherein the step of tuning includes steps of:

engaging a first end of the tuning tool with the connector and a second end of the tuning tool with a master connector;

causing light to pass through the master connector and through the connector;

measuring the light passing through the connector as the tuning tool, the hub, and the ferrule of the connector are rotated;

noting an orientation of the ferrule at which a desired performance is obtained; and returning the ferrule to the orientation.

29. A method for fixing a hub of a fiber optic connector in rotational alignment with respect to a housing of the connector, the method comprising:

providing a tuning tool, the tuning tool configured to engage and rotate the hub about a longitudinal axis of the connector;

tuning the fiber optic connector using the tuning tool by rotating the hub and associated ferrule and optical fiber about the longitudinal axis of fiber optic connector;

sliding a press ring along the tuning tool toward the hub, the press ring including an outer surface and an inner surface, the outer surface defining a geometry complementary to an inner surface of the housing to prevent relative rotation, and the inner surface of the press ring configured to engage the hub so that the hub is maintained in rotational alignment while moving along the longitudinal axis of the connector; and pressing the press ring into the housing, thereby retaining the optical fiber at a known rotational orientation with respect to the housing.

30. The method of claim 29, further comprising a step of aligning a tab on the inner surface of the press ring with a groove running along a longitudinal direction of the tuning tool.

31. The method of claim 29, further comprising a step of aligning a tab on the inner surface of the press ring with a notch on the hub.

32. The method of claim 29, further comprising a step of disengaging the tuning tool from the hub of the fiber optic connector.

33. A method for fixing a hub of a fiber optic connector in rotational alignment with respect to a housing of the connector, comprising:

tuning the fiber optic connector by rotating the hub and associated ferrule and optical fiber about the longitudinal axis of fiber optic connector;

sliding a press ring toward the hub, the press ring including an outer surface and an inner surface, the outer surface defining a geometry complementary to an inner surface of the housing to prevent relative rotation, and the inner surface of the press ring configured to engage the hub so that the hub is maintained in rotational alignment while moving along the longitudinal axis of the connector; and pressing the press ring into the housing, thereby retaining the optical fiber at a known rotational orientation with respect to the housing.

34. The method of claim 33, further comprising providing a tuning tool, the tuning tool configured to engage and rotate the hub about a longitudinal axis of the connector.

35. A kit for tuning a fiber optic connector, the connector including a hub engaging a ferrule surrounding an optical fiber of the fiber optic connector, a housing surrounding the hub and including an inner surface defining a bore, the inner surface defining a first engagement surface, the kit comprising:

a tuning tool configured to engage and rotate the hub; and a press ring including an outer surface and an inner surface, the outer surface defining a second engagement surface configured to engage the first engagement surface of the inner surface of the housing to prevent relative rotation, and the inner surface of the press ring configured to engage the hub so that the hub is maintained in rotational alignment while moving along the longitudinal axis of the connector.

* * * * *